United States Patent [19]

Butter

[11] 4,191,470

[45] Mar. 4, 1980

[54] LASER-FIBER OPTIC INTERFEROMETRIC STRAIN GAUGE

[75] Inventor: Charles D. Butter, Cologne, Minn.

[73] Assignee: Honeywell Inc., Minneapolis, Minn.

[21] Appl. No.: 943,588

[22] Filed: Sep. 18, 1978

[51] Int. Cl.² .......................................... G01B 11/16
[52] U.S. Cl. ..................................... 356/35.5; 73/800
[58] Field of Search ................. 356/35.5, 357, 358; 73/800

[56] References Cited

U.S. PATENT DOCUMENTS

| | | | |
|---|---|---|---|
| 3,664,739 | 5/1972 | Pryor | 356/35.5 X |
| 4,163,397 | 8/1979 | Harmer | 73/800 |

Primary Examiner—Edward S. Bauer
Assistant Examiner—Matthew W. Koren
Attorney, Agent, or Firm—Omund R. Dahle

[57] ABSTRACT

This invention is directed to a laser-fiber optic interferometric strain gauge. This is a strain gauge that can be read out by means of fiber optics, which has no power other than optical at the strain gauge. Laser light is directed into two single mode fibers, which fibers are attached to a supporting member the strain of which is to be measured. The ends of the fibers are brought into close proximity and the light coming out of the two fibers interferes. When the supporting member is strained the fringes move giving a measure of the strain.

4 Claims, 1 Drawing Figure

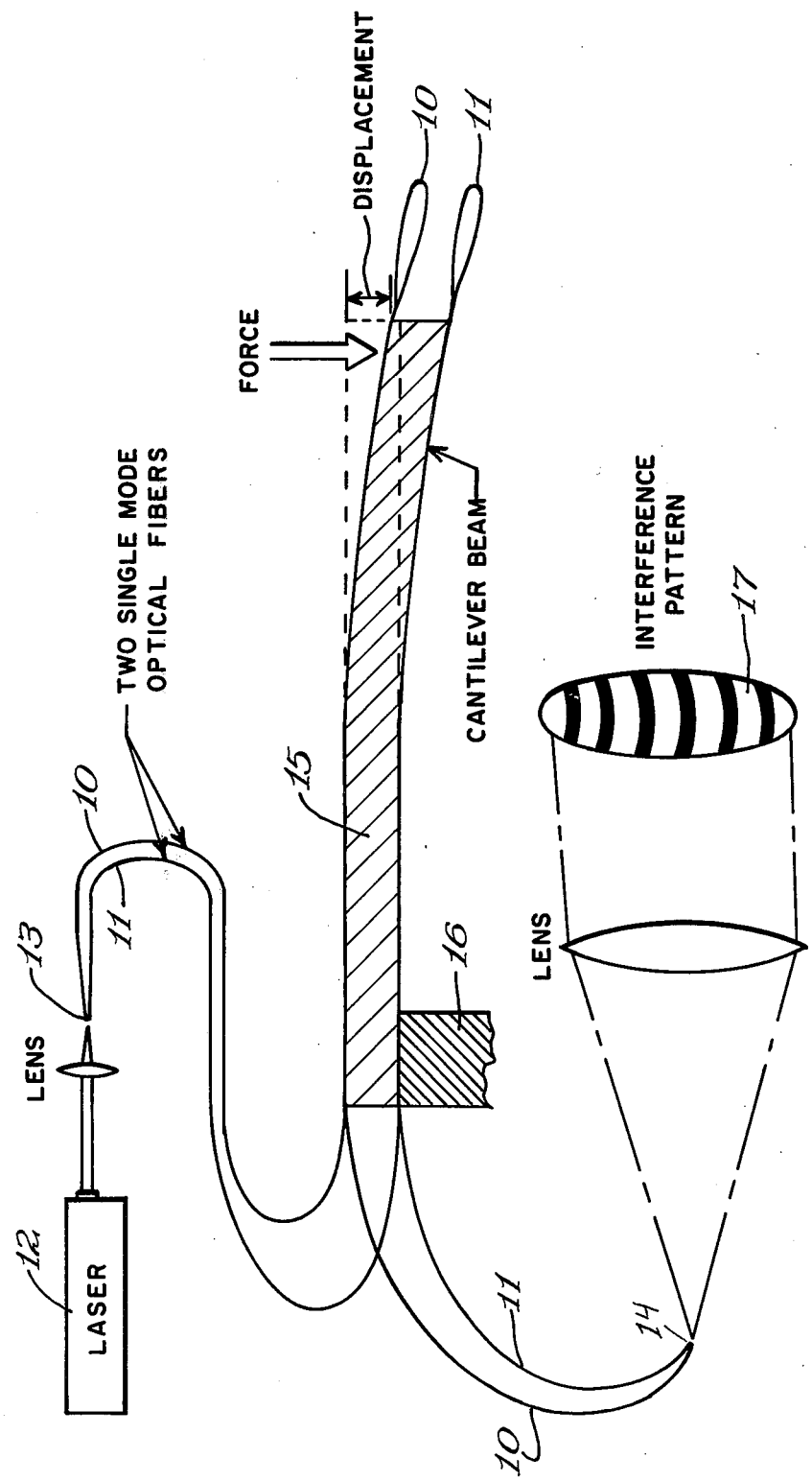

LASER-FIBER OPTIC INTERFEROMETRIC STRAIN GAUGE

BACKGROUND AND SUMMARY OF THE INVENTION

The present invention relates to the general field of laser-fiber optic interferometric strain gauges. One somewhat related strain gauge shown in the prior art is U.S. Pat. No. 3,327,584 (FIG. 15). The improved strain gauge embodiment shown in the present invention, however, utilizes two single mode fibers for the sensors, these sensors being affixed, respectively, to opposite sides of a cantilever beam which is subject to being strained, and a coherent light source from a laser illuminating the single mode fibers.

If laser light is put into two single mode fibers and these fibers are attached to some member whose strain you wish to measure at two different loci of strain and the ends of these fibers are brought into close proximity, the light coming out of the two fibers will interfere. When the supporting member is strained the fringes will move giving a measure of the strain.

BRIEF DESCRIPTION OF THE DRAWING

The single FIGURE of the drawing is a diagrammatic presentation of a preferred embodiment of the invention.

DESCRIPTION

A general description of the laser-fiber optic interferometric strain gauge is presented before referring to the drawing. If light from a He-Ne laser (or any other laser with sufficient coherence length) is launched into the ends of two single mode optical fibers the light emanating from the other ends can be made to interfere, producing fringes. If the length of one fiber changes with respect to the other fiber, the relative phase of the light emanating from the ends of the fibers will change. This change in relative phase will change the angular position of the interference fringes produced. The change in that angular position will be a measure of the relative change in the length of the two fibers.

Referring now to the single figure of the drawing there is disclosed two single-mode optical fibers 10 and 11 which are designed to carry the coherent light from a laser 12 (for example, He-Ne laser) from inputs 13 of the fibers to the outputs at 14. In this invention single mode fibers is defined by the relation $$V = 2\pi a/\lambda (n1^2 - n2^2)^{\frac{1}{2}} < 2.405$$

where
 $\lambda$ = free-space wavelength of light used
 n1 = core index of refraction
 n2 = cladding index of refraction
 a = radius of fiber core.

The fibers 10 and 11 are attached, respectively, to different portions of, such as the upper and lower surfaces of, a strainable beam 15 which beam may be for example a cantilever type. The fibers may be fastened with a suitable adhesive to the beam. The left end of the beam 15 is secured to a rigid support 16. In this embodiment the fibers 10 and 11 are shown as looped back on themselves along the length of the beam 15 to double the length of the fiber being strained. The doubling back is not a necessary part to the invention, however. In the figure the beam 15 is shown in a deflected position because of an applied "force" downwardly. Dashed lines show the unstrained position of the beam. When the beam is deflected such as is shown, the upper fiber 10 tends to be stretched and lengthened while the lower fiber 11 tends to be compressed. As shown in the drawing, it may be desirable to provide optical lens between the laser light source 12 and the input 13 to the optical fibers and/or at the output 14 of the two fibers. The interfering light coming out of the two fibers 10 and 11 appears in the form of an interference pattern 17 and when the beam member 15 is strained the fringes will move giving a measure of the strain. Thus the optical path in one fiber is lengthened while the other is shortened thereby causing a fringe shift in the interference pattern between coherent light traversing both paths.

The embodiments of the invention in which an exclusive property or right is claimed are defined as follows:

1. Optical strain gauge apparatus comprising:
 first and second single mode optical fibers;
 beam means subject to strain to be measured;
 means fastening portions of said first and second fibers, respectively, to different portions of said beam means;
 laser means positioned with respect to one end of said fibers to transmit coherent laser light through the length of said fibers; and
 means positioning the other end of said first and second fibers in close proximity so that the coherent laser light emanating therefrom produces an optical interference pattern,
 whereby when said beam means is subjected to strain said optical interference pattern changes to give a measure of strain.

2. The apparatus according to claim 1 wherein said beam means are cantilever beam means.

3. The apparatus according to claim 1 wherein said different portions of said beam means are opposite sides of said beam means.

4. Optical strain gauge apparatus comprising:
 first and second single mode optical fibers adapted to be fastened, respectively, to different positions on strainable beam means, the different positions having different strains one from the other;
 laser means positioned with respect to one end of said fibers to transmit coherent laser light through the length of said fibers; and
 means positioning the other end of said first and second fibers in close proximity so that the coherent laser light emanating therefrom produces an optical interference pattern,
 whereby when optical fibers are subjected to strain said optical interference pattern changes to give a measure of strain.

* * * * *